US008621057B2

(12) United States Patent
Kuroda et al.

(10) Patent No.: US 8,621,057 B2
(45) Date of Patent: Dec. 31, 2013

(54) ESTABLISHING RELATIONSHIPS AMONG ELEMENTS IN A COMPUTING SYSTEM

(75) Inventors: Akihiko Kuroda, Cary, NC (US); Nikita Mathur, Pune (IN); Sanket S. Sangwikar, Kaylan (IN)

(73) Assignee: International Business Machines Corporation, Armonk, NY (US)

( * ) Notice: Subject to any disclaimer, the term of this patent is extended or adjusted under 35 U.S.C. 154(b) by 340 days.

(21) Appl. No.: 13/041,667

(22) Filed: Mar. 7, 2011

(65) Prior Publication Data

US 2012/0233607 A1    Sep. 13, 2012

(51) Int. Cl.
*G06F 15/173*    (2006.01)

(52) U.S. Cl.
USPC ........... 709/223; 709/220; 709/248; 709/249; 715/735; 715/736

(58) Field of Classification Search
USPC ................. 709/220, 223, 228, 238, 249, 248; 715/735, 736
See application file for complete search history.

(56) References Cited

U.S. PATENT DOCUMENTS

| | | | | |
|---|---|---|---|---|
| 5,692,193 A * | 11/1997 | Jagannathan et al. | ........ | 718/106 |
| 6,920,494 B2 * | 7/2005 | Heitman et al. | ............... | 709/223 |
| 7,284,067 B2 * | 10/2007 | Leigh | ........................... | 709/238 |
| 7,310,666 B2 * | 12/2007 | Benfield et al. | ................ | 709/223 |
| 7,337,184 B1 * | 2/2008 | Or et al. | ................................ | 1/1 |
| 7,437,477 B2 * | 10/2008 | Kuik et al. | ..................... | 709/238 |
| 7,487,240 B2 * | 2/2009 | Proulx et al. | .................. | 709/224 |
| 7,562,132 B2 * | 7/2009 | Benfield et al. | ............... | 709/223 |
| 7,684,420 B2 * | 3/2010 | Li | .................. | 370/401 |
| 7,823,145 B1 * | 10/2010 | Le et al. | ......................... | 717/168 |
| 8,032,625 B2 * | 10/2011 | Benfield et al. | ............... | 709/224 |
| 8,045,486 B2 * | 10/2011 | Swan | ............................. | 370/255 |
| 8,054,832 B1 * | 11/2011 | Shukla et al. | ................. | 370/389 |
| 8,175,863 B1 * | 5/2012 | Ostermeyer et al. | ............ | 703/22 |
| 8,200,803 B2 * | 6/2012 | Benfield et al. | ............... | 709/223 |
| 8,331,362 B2 * | 12/2012 | Shukla et al. | ................. | 370/389 |
| 8,352,620 B2 * | 1/2013 | Conrad | ......................... | 709/228 |
| 8,369,329 B2 * | 2/2013 | Koehler et al. | ............... | 370/392 |
| 2002/0143927 A1 * | 10/2002 | Maltz et al. | .................... | 709/224 |
| 2003/0041167 A1 * | 2/2003 | French et al. | ................. | 709/238 |
| 2003/0097438 A1 * | 5/2003 | Bearden et al. | ............... | 709/224 |
| 2005/0226265 A1 * | 10/2005 | Takatori | ........................ | 370/452 |
| 2009/0235174 A1 * | 9/2009 | Royt | ............................. | 715/735 |
| 2010/0094981 A1 * | 4/2010 | Cordray et al. | ............... | 709/222 |
| 2010/0251234 A1 * | 9/2010 | Oshins | .............................. | 718/1 |
| 2010/0262467 A1 * | 10/2010 | Barnhill et al. | ................. | 705/10 |
| 2011/0029675 A1 * | 2/2011 | Yeow et al. | ..................... | 709/226 |
| 2012/0110188 A1 * | 5/2012 | Van Biljon et al. | ............ | 709/226 |
| 2012/0158938 A1 * | 6/2012 | Shimonishi et al. | .......... | 709/223 |
| 2012/0233607 A1 * | 9/2012 | Kuroda et al. | ..................... | 718/1 |
| 2013/0073702 A1 * | 3/2013 | Umbehocker | ................ | 709/222 |

* cited by examiner

*Primary Examiner* — Michael Y Won
(74) *Attorney, Agent, or Firm* — H. Barrett Spraggins; H. Daniel Schnurmann; Biggers Kennedy Lenart Spraggins LLP

(57) ABSTRACT

Establishing relationships among elements in a computing system, the computing system including one or more servers, one or more switches, the one or more servers and one or more switches forming one or more local area networks and also forming one or more virtual local area networks, including: identifying, for each server in the computing system, physical topology data; identifying, for each server in the computing system, virtual topology data; and creating, in dependence upon the physical topology data and the virtual topology data, a system map.

21 Claims, 8 Drawing Sheets

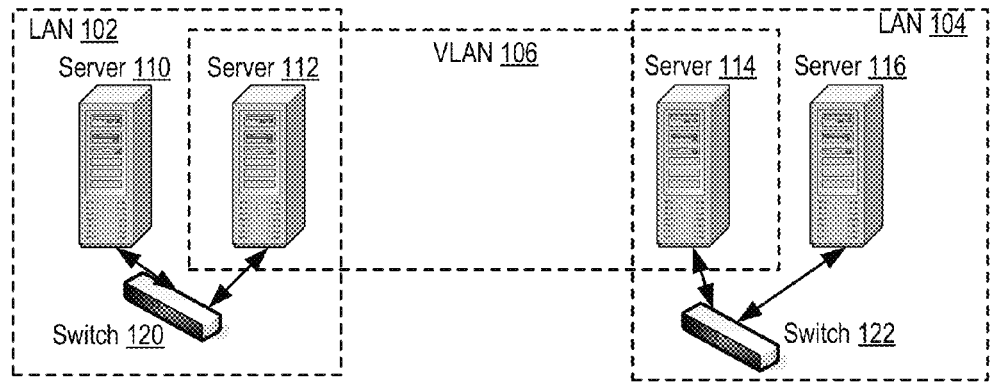
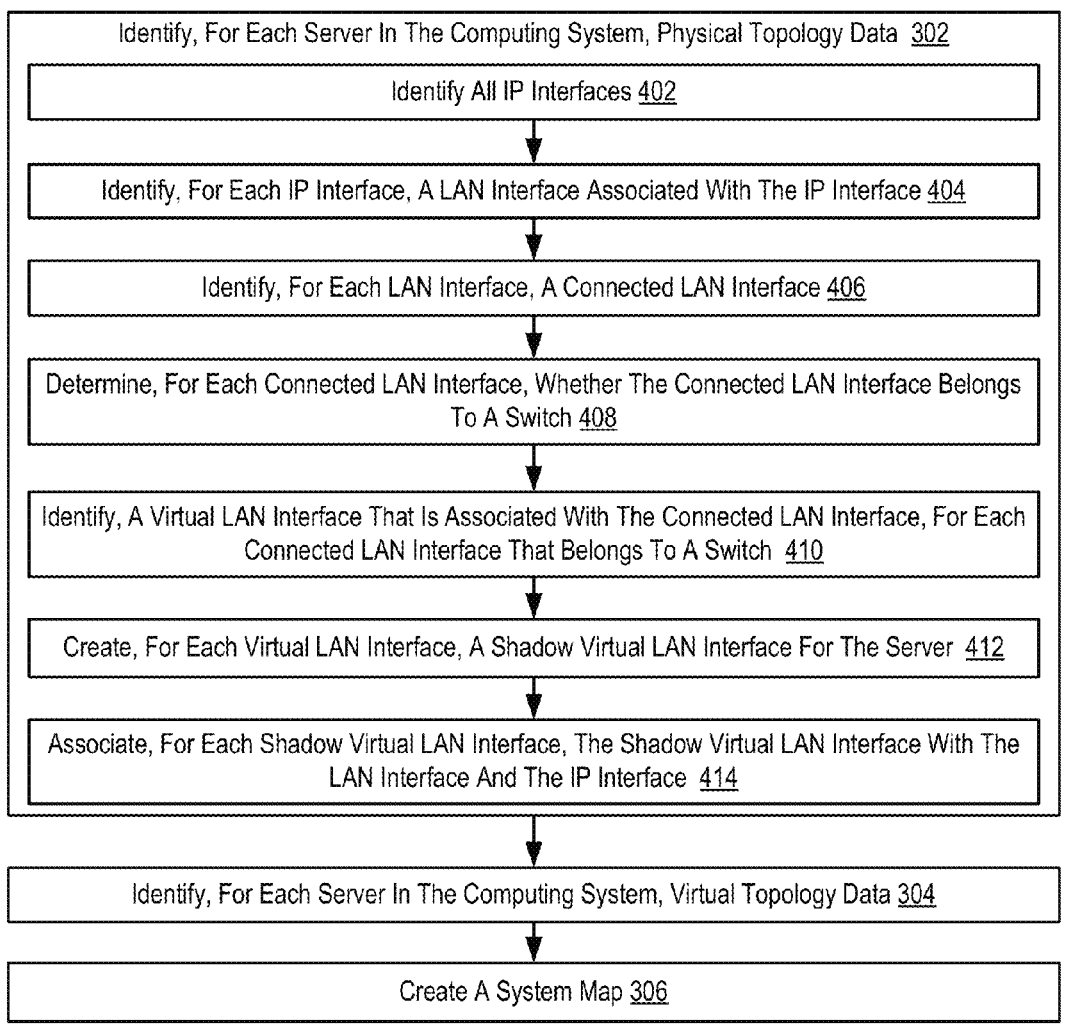
FIG. 4

| Name | Type | Access | Problems |
|---|---|---|---|
| ⊟ VLAN 106 | Virtual LAN | ☑ | |
| ⊟ SUBN 102 | Subnet | ☑ | |
| ⊟ SRVR 110 | Server | ☑ | |
| ⊞ VM 1 | Virtual Machine | ☑ | |
| ⊞ VM 2 | Virtual Machine | ☑ | |
| ⊞ IPI 02 | IP Interface | ☑ | |
| ⊟ SRVR 112 | Server | ☑ | Low Battery |
| ⊞ VM 1 | Virtual Machine | ☑ | |
| ⊞ VM 2 | Virtual Machine | ☑ | |
| ⊞ IPI 01 | IP Interface | ☑ | |
| ⊞ SWTCH 1 | Switch | ☑ | |
| ⊟ VLAN 108 | Virtual LAN | ☑ | |
| ⊟ SUBN 104 | Subnet | ☑ | |
| ⊟ SRVR 114 | Server | ☑ | |
| ⊞ VM 1 | Virtual Machine | ☑ | |
| ⊞ VM 2 | Virtual Machine | ☑ | |
| ⊞ IPI 03 | IP Interface | ☑ | |
| ⊟ SRVR 116 | Server | ☑ | |
| ⊞ VM 1 | Virtual Machine | ☑ | |
| ⊞ VM 2 | Virtual Machine | ☑ | |
| ⊞ IPI 04 | IP Interface | ☑ | |
| ⊞ SWTCH 2 | Switch | ☑ | Software OOD |

FIG. 7

ESTABLISHING RELATIONSHIPS AMONG ELEMENTS IN A COMPUTING SYSTEM

BACKGROUND OF THE INVENTION

1. Field of the Invention

The field of the invention is data processing, or, more specifically, methods, apparatus, and products for establishing relationships among elements in a computing system.

2. Description Of Related Art

Platform or system management applications provide a user interface for single point of management of various types of systems like switches, servers, virtual machines and hypervisors. Such system management applications present individual views of systems based on the type of device that is being monitored and based on parameters like processing utilization, memory utilization, power consumption, and so on. There is difficulty in showing connectivity between a plurality of elements in a managed computing system, along with information regarding the particular networks that an element is connected to because such connections are configured at different network interfaces in the system. Establishing some correlation between the interfaces that control an element's network connections can create a comprehensive and simpler view for a user of a system management application.

SUMMARY OF THE INVENTION

Methods, apparatus, and products for establishing relationships among elements in a computing system. The computing system includes one or more servers and one or more switches. The one or more servers and one or more switches form one or more local area networks and also form one or more virtual local area networks. The methods, apparatus, and products for establishing relationships among elements in a computing system include: identifying, for each server in the computing system, physical topology data; identifying, for each server in the computing system, virtual topology data; and creating, in dependence upon the physical topology data and the virtual topology data, a system map.

The foregoing and other objects, features and advantages of the invention will be apparent from the following more particular descriptions of example embodiments of the invention as illustrated in the accompanying drawings wherein like reference numbers generally represent like parts of example embodiments of the invention.

BRIEF DESCRIPTION OF THE DRAWINGS

FIG. 4 sets forth a flow chart illustrating an example method for establishing relationships among elements in a computing system according to embodiments of the present invention.

FIG. 7 sets forth an example GUI in which a system map is depicted as a table according to embodiments of the present invention.

DETAILED DESCRIPTION OF EXAMPLE EMBODIMENTS

Figure 1:
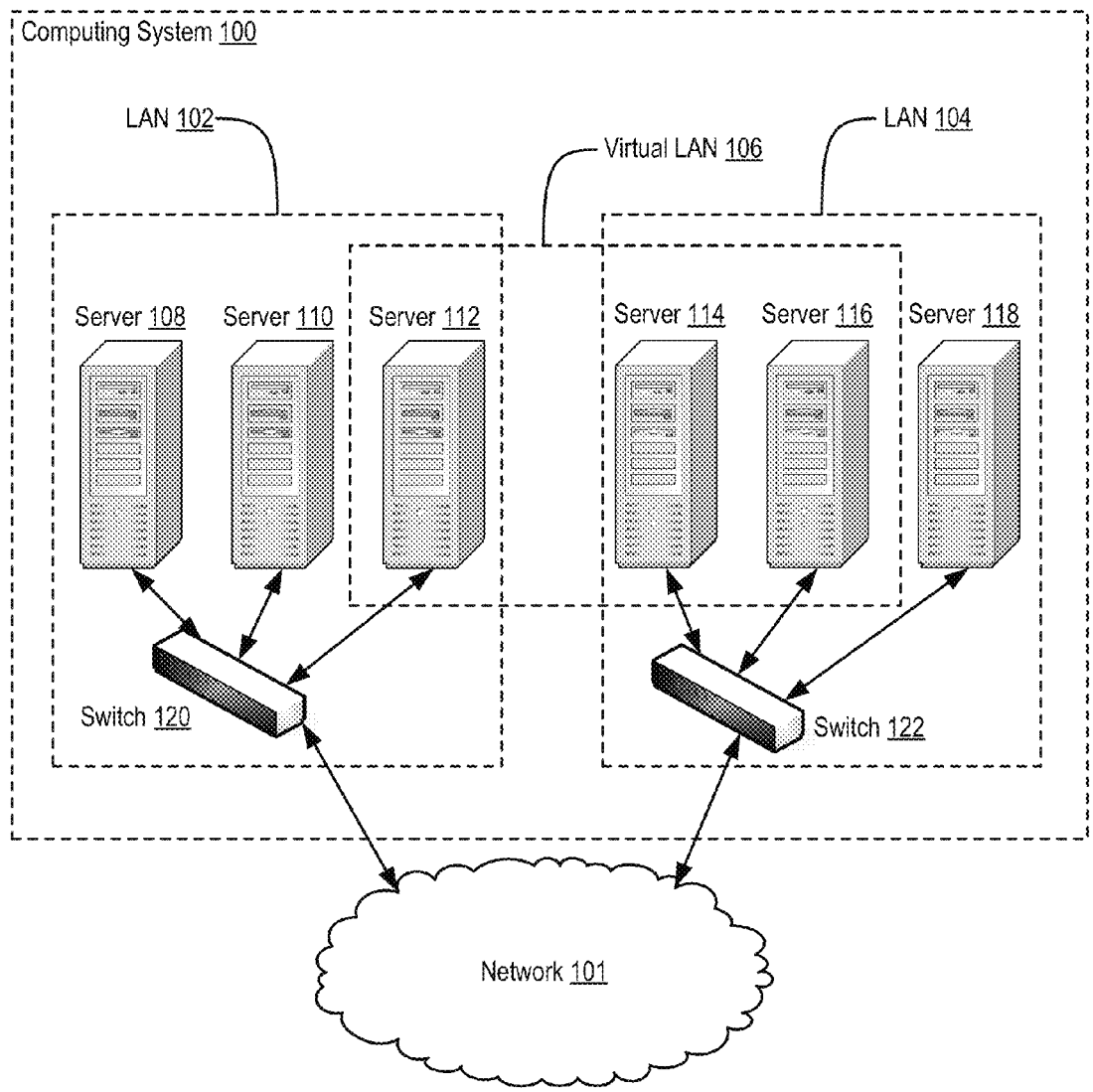
FIG. 1 sets forth a network diagram of a computing system in which relationships among elements of the computing system are established according to embodiments of the present invention.

Example methods, apparatus, and products for establishing relationships among elements in a computing system in accordance with the present invention are described with reference to the accompanying drawings, beginning with FIG. 1. FIG. 1 sets forth a network diagram of a computing system (100) in which relationships among elements of the computing system (100) are established according to embodiments of the present invention. The computing system (100) of FIG. 1 includes one or more servers (108, 110, 112, 114, 116, 118) and one or more switches (120, 122). In the example of FIG. 1, each server (108, 110, 112, 114, 116, 118) is automated computing machinery for providing computational services across a network. Each server (108, 110, 112, 114, 116, 118) may be embodied, for example, as a blade server in a blade chassis, as a stand-alone computer, or in other ways as will occur to those of skill in the art. In the example of FIG. 1, each switch (120, 122) is automated computing machinery for connecting segments in the computing system (100). Although the computing system (100) of FIG. 1 includes only servers (108, 110, 112, 114, 116, 118) and switches (120, 122), the computing system (100) may also include other computing components such as, for example, computer storage devices, printers, personal computers, and so on.

In the example of FIG. 1, the one or more servers (108, 110, 112, 114, 116, 118) and the one or more switches (120, 122) form at least one local area network ('LAN') (102, 104). Each LAN (102, 104) in FIG. 1 is a network of computers in a particular geographic region such as, for example, an office, a home, a lab, and so on. Devices in a particular LAN (102, 104) may communicate with devices outside of the LAN (102, 104) by sending data communication messages from an entity within the LAN (102, 104), such as the switch (120, 122), to devices on another network (101).

In the example of FIG. 1, the one or more servers (108, 110, 112, 114, 116, 118) and one or more switches (120, 122) also form at least one virtual local area network ('VLAN') (106). Each VLAN (106) in FIG. 1 is a network of computers that function as a LAN in spite of the fact that the computers that comprise the VLAN (106) may not be within the same geographic region.

In the example of FIG. 1, relationships among elements of the computing system are established by identifying, for each server (108, 110, 112, 114, 116, 118) in the computing system, physical topology data. In the example of FIG. 1, physical topology data is data that describes the physical devices, and the connections between such physical devices, that are part of the computing system (100). Physical topology data may include an identification of physical devices in the computing system (100), descriptions of the devices in the computing system (100), interfaces within the physical devices in the computing system (100) that enable the physical devices to connect to other physical devices, and so on. Physical topology data that describes data communications interfaces in a particular device may include, for example, data that describes an interface within a particular device that enables the device to connect to a LAN, data that describes an interface within a particular device that enables the device to connect to a VLAN, data that describes an interface within a particular device that enables the device to connect to an IP network, and so on. In the example of FIG. 1, identifying physical topology data for each server (108, 110, 112, 114, 116, 118) in the computing system may be carried out by polling each server (108, 110, 112, 114, 116, 118) for information about the server. For example, each server (108, 110, 112, 114, 116, 118) may be polled to identify the IP address of the server (108, 110, 112, 114, 116, 118), to identify the MAC address of the server (108, 110, 112, 114, 116, 118), to identify a particular LAN that the server (108, 110, 112, 114, 116, 118) is part of, and so on.

In the example of FIG. 1, relationships among elements of the computing system are also established by identifying, for each server (108, 110, 112, 114, 116, 118) in the computing system, virtual topology data. In the example of FIG. 1, virtual topology data is data that describes virtual devices, such as a virtual machine, that are operating on a particular physical device in the computing system (100). In the example of FIG. 1, a virtual machine is a software implementation of automated computing machinery, such as a computer, that executes programs like a physical machine. A virtual machine is often designed to be an efficient and isolated duplicate of a physical machine. A virtual machine as that term is used in this specification provides a complete system platform to supports the execution of a resource manager and therefore often supports a complete operating system or resources of the operation system necessary for execution of the resource manager. Such a virtual machine may be, and often is, distributed. That is, portions of virtual machines according to embodiments of the present invention may reside on multiple different physical machines.

In the example of FIG. 1, virtual topology data may include an identification of virtual machines that are executing on a physical device in the computing system (100), as well as information describing data communications interfaces associated with virtual machines that are executing on a particular physical device. Data communications interfaces associated with virtual machines that are executing on a particular physical device may include, for example, an identifier for a virtual switch that routes data communications to virtual machines that are executing on a particular physical device, an identifier of an interface associated with a virtual machine that enables the virtual machine to establish data communications with the virtual switch, and so on. In the example of FIG. 1, identifying virtual topology data for each server (108, 110, 112, 114, 116, 118) in the computing system may be carried out, for example, by polling a hypervisor that manages the virtual machines that are executing on a physical device.

In the example of FIG. 1, relationships among elements of the computing system are also established by creating, in dependence upon the physical topology data and the virtual topology data, a system map. In the example of FIG. 1, a system map is a data structure that contains information about elements, such as the servers (108, 110, 112, 114, 116, 118) and switches (120, 122), that are in the computing system (100). The system map can include, for example, an identification of each physical device in the system, an identification of each virtual device such as a virtual machine that is in the system, an identification of the physical devices and virtual devices that a particular device can communicate with, information describing the data communications interfaces that a particular device utilizes to communication with other virtual devices and physical devices, and so on. In the example of FIG. 1, creating a system map may be carried out by combining the physical topology data and virtual topology data for each element in the computing system. Table 1 illustrates an example of a user interface generated from a system map embodied as a table that may be created for the computing system of FIG. 1.

TABLE 1

| User Interface For A System Map | | | | |
|---|---|---|---|---|
| System | IP Interface | VLAN Interface | Subnet | VLAN |
| Server 108 | IP01 | Ep01 | Subnet 102 | — |
| Server 110 | IP02 | Ep02 | Subnet 102 | — |
| Server 112 | IP03 | Ep03 | Subnet 102 | VL106 |
| Switch 120 | IP04 | Ep01 | Subnet 102 | — |
| Switch 120 | IP04 | Ep02 | Subnet 102 | — |
| Switch 120 | IP04 | Ep03 | Subnet 102 | VL106 |
| Server 114 | IP11 | Ep10 | Subnet 104 | VL106 |

Table 1 illustrates a user interface generated from a partial system map. The first column of Table 1 is titled "system" and is reserved for an identifier for the particular system element that the row in the table describes. The second column of Table 1 is titled "IP Interface" and is reserved for a description of the IP interface for each system in the table. As shown in the table above, each device has a unique IP interface. The third column of Table 1 is titled "VLAN Interface" and is reserved for an identifier of the interface of a VLAN for each device. For each server, the VLAN interface is a shadow interface of the VLAN interface for a switch that the server is connected to. The fourth column of Table 1 is titled "Subnet" and identifies a particular subnet that a system is part of. The fifth column of Table 1 is titled "VLAN" and identifies the particular VLAN that the system element if part of The system map described above is only one possible embodiment. Other embodiments may include different fields and may be embodied in entirely different data structures.

The arrangement of servers and other devices making up the example system illustrated in FIG. 1 are for explanation, not for limitation. Computing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Establishing relationships among elements in a computing system in accordance with the present invention is generally implemented with computers, that is, with automated computing machinery. For further explanation, therefore, FIG. 2 sets forth a block diagram of automated computing machinery comprising an example system management server (152) useful in establishing relationships among elements in a computing system according to embodiments of the present invention. The system management server (152) of FIG. 2 includes at least one computer processor (156) or 'CPU' as well as random access memory (168) ('RAM') which is connected through a high speed memory bus (166) and bus adapter (158) to processor (156) and to other components of the system management server (152).

Stored in RAM (168) is a system management application (202), a module of computer program instructions for establishing relationships among elements in a computing system according to embodiments of the present invention. The system management application (202) includes a physical topology discovery module (204), a module of computer program instructions for identifying, for each server in the computing system, physical topology data. The system management application (202) also includes a virtual topology discovery module (206), a module of computer program instructions for identifying, for each server in the computing system, virtual topology data according to embodiments of the present invention. The system management application (202) also includes a map generation module (208), a module of computer program instructions for creating, in dependence upon the physical topology data and the virtual topology data, a system map.

Also stored in RAM (168) is an operating system (154). Operating systems useful establishing relationships among elements in a computing system according to embodiments of the present invention include UNIX™, Linux™, Microsoft XP™, AIX™, IBM's i5/OS™, and others as will occur to those of skill in the art. The operating system (154), system management application (202), physical topology discovery module (204), virtual topology discovery module (206), and map generation module (208) in the example of FIG. 2 are shown in RAM (168), but many components of such software typically are stored in non-volatile memory also, such as, for example, on a disk drive (170).

Figure 2:
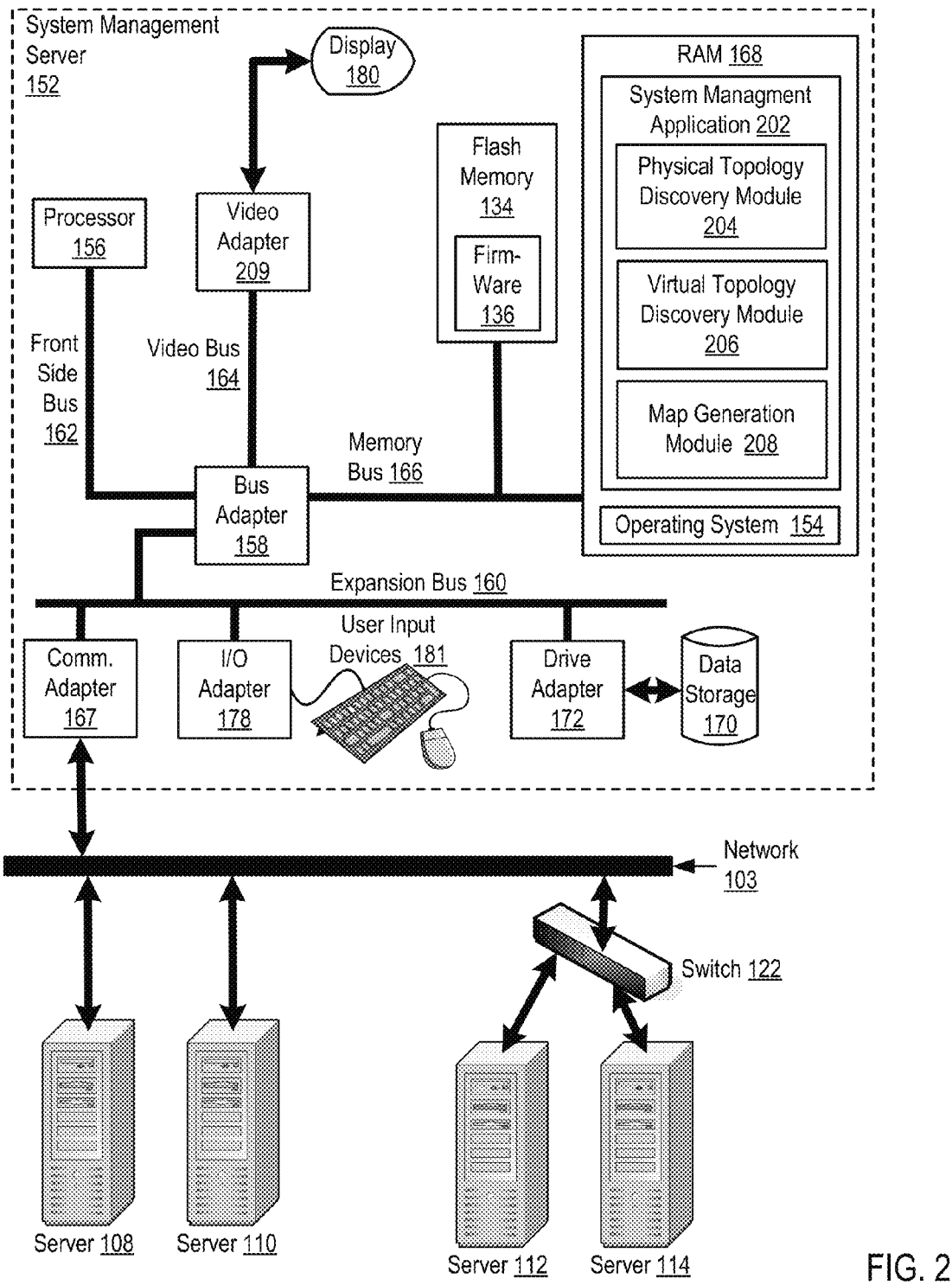
FIG. 2 sets forth a block diagram of automated computing machinery comprising an example system management server useful in establishing relationships among elements in a computing system according to embodiments of the present invention.

The system management server (152) of FIG. 2 includes disk drive adapter (172) coupled through expansion bus (160) and bus adapter (158) to processor (156) and other components of the system management server (152). Disk drive adapter (172) connects non-volatile data storage to the system management server (152) in the form of disk drive (170). Disk drive adapters useful in computers for establishing relationships among elements in a computing system according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example system management server (152) of FIG. 2 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example system management server (152) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example system management server (152) of FIG. 2 includes a communications adapter (167) for data communications with other computers such as servers (108, 110, 112, 114) and switches (122) and for data communications with a data communications network (103). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for establishing relationships among elements in a computing system according to embodiments of the present invention include modems for wired dial-up communications, Ethernet (IEEE 802.3) adapters for wired data communications network communications, and 802.11 adapters for wireless data communications network communications.

Figure 3:
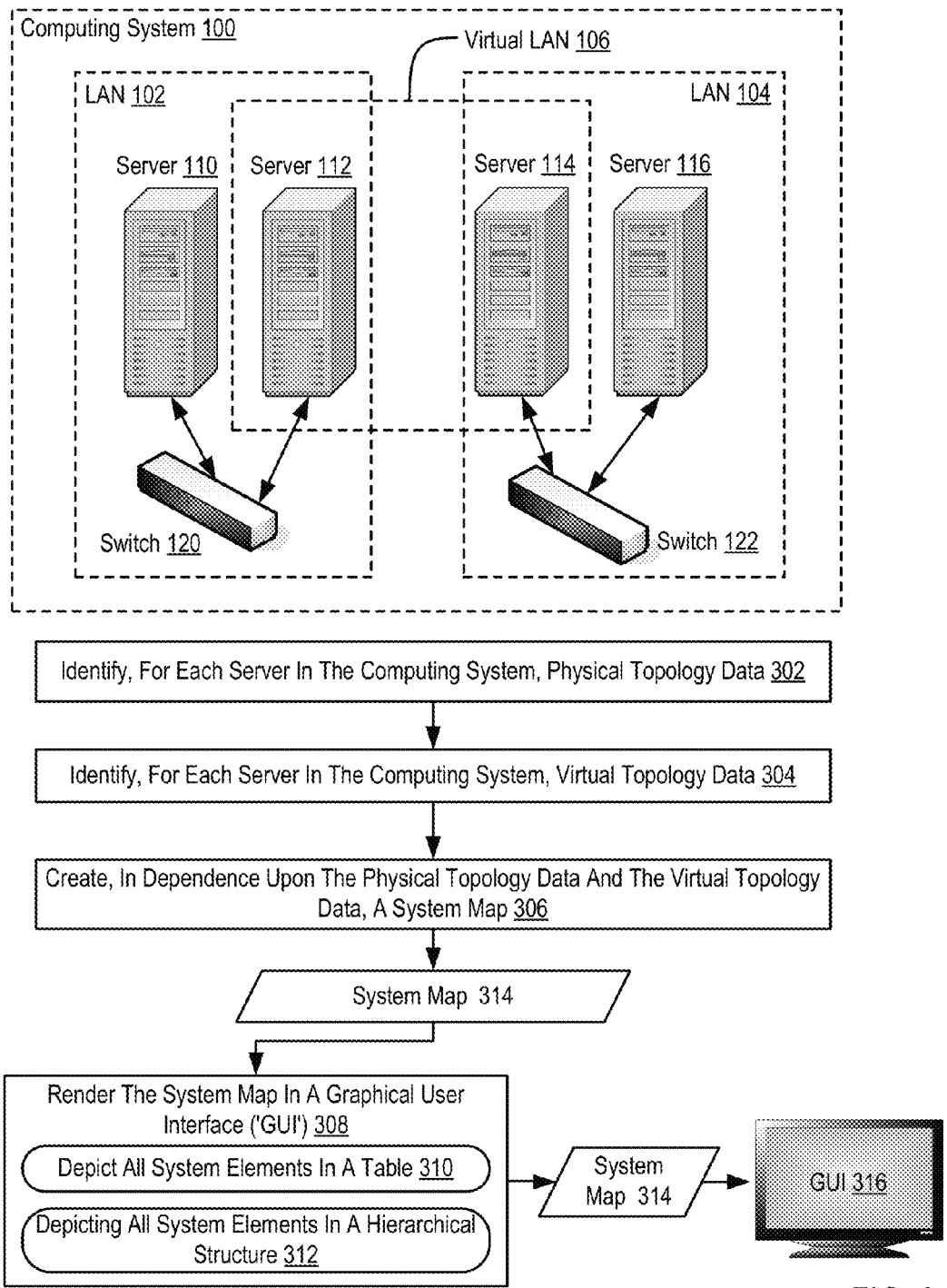
FIG. 3 sets forth a flow chart illustrating an example method for establishing relationships among elements in a computing system according to embodiments of the present invention.

For further explanation, FIG. 3 sets forth a flow chart illustrating an example method for establishing relationships among elements in a computing system (100) according to embodiments of the present invention. The computing system (100) of FIG. 3 includes one or more servers (110, 112, 114, 116) and one or more switches (120, 122). In the example of FIG. 3, each server (110, 112, 114, 116) is automated computing machinery for providing computational services across a network. Each server (110, 112, 114, 116) may be embodied, for example, as a blade server in a blade chassis, as a stand-alone computer, or in other ways as will occur to those of skill in the art. In the example of FIG. 3, each switch (120, 122) is automated computing machinery for connecting segments in the computing system (100). Although the computing system (100) of FIG. 3 includes only servers (110, 112, 114, 116) and switches (120, 122), the computing system (100) may also include other computing components such as, for example, computer storage systems, personal computers, and so on.

In the example of FIG. 3, the one or more servers (110, 112, 114, 116) and one or more switches (120, 122) form at least one or more LANs (102, 104). Each LAN (102, 104) in FIG. 3 is a network of computers in a particular geographic region such as, for example, an office, a home, a lab, and so on. Devices in a particular LAN (102, 104) may communicate with devices outside of the LAN (102, 104) by sending data communication messages from an entity within the LAN (102, 104), such as the switch (120, 122), to devices on another network. In the example of FIG. 3, the one or more servers (110, 112, 114, 116) and one or more switches (120, 122) also form at least one or more VLANs (106). Each VLAN (106) in FIG. 3 is a network of computers that function as a LAN in spite of that the computers that comprise the VLAN (106) may not be within the same geographic region. Although the example of FIG. 3 describes the one or more servers (110, 112, 114, 116) and one or more switches (120, 122) as being segmented into multiple LANs (102, 104), readers will appreciate that the one or more servers (110, 112, 114, 116) and one or more switches (120, 122) may also be segmented into one or more subnets in embodiments of the present invention. Information such as a range of IP addresses for members of the subnet, a subnet mask, a subnet number may be used to define physical topology of the elements in the computing system (100).

The example of FIG. 3 includes identifying (302), for each server (110, 112, 114, 116) in the computing system (100), physical topology data. In the example of FIG. 3, physical topology data is data that describes the physical devices, and the connections between such physical devices, that are part of the computing system (100). Physical topology data may include an identification of physical devices in the computing system (100), descriptions of the devices in the computing system (100), interfaces within the physical devices in the computing system (100) that enable the physical devices to connect to other physical devices, and so on. Physical topology data that describes data communications interfaces in a particular device may include, for example, data that describes an interface within a particular device that enables the device to connect to a LAN, data that describes an interface within a particular device that enables the device to connect to a VLAN, data that describes an interface within a particular device that enables the device to connect to an IP network, and so on.

In the example of FIG. 3, identifying (302) physical topology data for each server (110, 112, 114, 116) in the computing system (100) may be carried out by polling each server (110, 112, 114, 116) for information about the server. For example, each server (110, 112, 114, 116) may be polled to identify the IP address of the server (110, 112, 114, 116), to identify the MAC address of the server (110, 112, 114, 116), to identify a particular LAN that the server (110, 112, 114, 116) is part of, and so on. Identifying (302) physical topology data for each server (110, 112, 114, 116) in the computing system (100) may also be carried out by polling ports on the switches (120, 122) to identify a particular VLAN that the server (110, 112, 114, 116) is part of, and so on.

The example of FIG. 3 also includes identifying (304), for each server (110, 112, 114, 116) in the computing system (100), virtual topology data. In the example of FIG. 3, virtual topology data is data that describes virtual devices, such as a virtual machine, that are operating on a particular physical device in the computing system (100). In the example of FIG. 3, a virtual machine is a software implementation of automated computing machinery, such as a computer, that executes programs like a physical machine. A virtual machine is often designed to be an efficient and isolated duplicate of a physical machine. A virtual machine as that term is used in this specification provides a complete system platform to supports the execution of a resource manager and therefore often supports a complete operating system or resources of the operation system necessary for execution of the resource manager. Such a virtual machine may be, and often is, distributed. That is, portions of virtual machines according to embodiments of the present invention may reside on multiple different physical machines.

In the example of FIG. 3, virtual topology data may include an identification of virtual machines that are executing on a physical device such as the servers (110, 112, 114, 116) in the computing system (100), as well as information describing data communications interfaces associated with virtual machines that are executing on a particular physical device. Data communications interfaces associated with virtual machines that are executing on a particular physical device may include, for example, an identifier for a virtual switch that routes data communications to virtual machines that are executing on one of the servers (110, 112, 114, 116), an identifier of an interface associated with a virtual machine that enables the virtual machine to establish data communications with the virtual switch, and so on. In the example of FIG. 3, identifying (304) virtual topology data for each server (110, 112, 114, 116) in the computing system (100) may be carried out, for example, by polling a hypervisor that manages the virtual machines that are executing on one of the servers (110, 112, 114, 116).

The example of FIG. 3 also includes creating (306), in dependence upon the physical topology data and the virtual topology data, a system map (314). In the example of FIG. 3, a system map (314) is a data structure that contains information about elements, such as the servers (110, 112, 114, 116) and switches (120, 122), that are in the computing system (100). The system map (314) of FIG. 3 can include, for example, an identification of each physical device in the system, an identification of each virtual device such as a virtual machine that is in the system, an identification of the physical devices and virtual devices that a particular device can communicate with, information describing the data communications interfaces that a particular physical device or virtual device utilizes to communicate with other virtual devices and physical devices, and so on.

In the example of FIG. 3, creating (306) a system map (314) may be carried out by combining the physical topology data and virtual topology data for each element in the computing system (100). Combining the physical topology data and virtual topology data for each element in the computing system (100) may include associating physical topology data with virtual topology data such that the system map includes information describing the physical components in the computing system (100), the virtual components in the computing system (100), and associations between such physical components and virtual components. For example, a system map (314) may be created by associating various pieces of physical topology data (e.g. subnet information for a subnet that each IP interface of server is part of, a LAN interface of a server that is bound to the IP interface, a VLAN interface for a server that corresponds to the LAN interface) with various pieces of virtual topology data (e.g., an identification of the virtual machines executing on a particular physical server, an identification of networks of virtual machines executing on one or more physical servers) such that a comprehensive view of each component in the computing system (100) and the relationships between each component in the computing system (100) can be constructed.

In the example of FIG. 3, creating (306) a system map (314) may be carried out by creating data structures to traverse relationships between subnet and VLANs for all the elements in the computing system (100). In such an example, data structures may be created such that a system, its VLAN interface, and its IP interface are connected to each other as a trio. This trio acts as a key to a subnets hashmap and a VLAN hashmap. Because the key connects these items of information, connections between a subnet and a VLAN may be established in order to identify which subnets are under a particular VLAN.

The example of FIG. 3 also includes rendering (308) the system map (314) in a GUI (316). In the example of FIG. 3, rendering (308) the system map (314) in a GUI (316) may be carried out, for example, by depicting (310) all system elements in a table. In the example of FIG. 3, rendering (308) the system map (314) in a GUI (316) may alternatively be carried out, for example, by depicting (312) all system elements in a hierarchical structure. Examples of depicting (310) all system elements in a table and depicting (312) all system elements in a hierarchical structure are described in more detail below with reference to FIG. 7 and FIG. 8.

For further explanation, FIG. 4 sets forth a flow chart illustrating an example method for establishing relationships among elements in a computing system (100) according to embodiments of the present invention. The example of FIG. 4 is similar to the example of FIG. 3 as it also includes identifying (302), for each server (110, 112, 114, 116) in the computing system (100), physical topology data; identifying (304), for each server (110, 112, 114, 116) in the computing system (100), virtual topology data; and creating (306), in dependence upon the physical topology data and the virtual topology data, a system map.

In the example of FIG. 4, identifying (302) physical topology data for each server (110, 112, 114, 116) in the computing system (100) includes identifying (402) all IP interfaces. In the example of FIG. 4, an IP interface is a data structure that includes information describing a server's (110, 112, 114, 116) interface to an IP network. An IP interface can include information about IP addressing such as the IP address of a particular server (110, 112, 114, 116), subnet information such as a subnet mask for a subnetwork that a particular server (110, 112, 114, 116) belongs to, and so on. Identifying (402) all IP interfaces may be carried out, for example, by polling a server (110, 112, 114, 116) for its IP address, subnet mask, or other information relating to a server's (110, 112, 114, 116) interface to an IP network.

In the example of FIG. 4, identifying (302) physical topology data for each server (110, 112, 114, 116) in the computing system (100) also includes identifying (404), for each IP interface, a LAN interface associated with the IP interface. In the example of FIG. 4, a LAN interface is a data structure that includes information describing the server's (110, 112, 114, 116) interface to a LAN. A LAN interface can include information such as the MAC address of the server (110, 112, 114, 116) that connects to the LAN. Identifying (404), for each IP interface, a LAN interface associated with the IP interface may be carried out, for example, by polling the server (110, 112, 114, 116) for its MAC address or other information relating to the server's (110, 112, 114, 116) interface to a LAN.

In the example of FIG. 4, identifying (302) physical topology data for each server (110, 112, 114, 116) in the computing system (100) also includes identifying (406), for each LAN interface, a connected LAN interface. In the example of FIG. 4, a connected LAN interface is an interface that resides with a device other than the server (110, 112, 114, 116) that includes the LAN interface. The connected LAN interface enables the device that includes the connected LAN interface to connect to the same LAN as the server (110, 112, 114, 116) that includes the LAN interface. Identifying (406), for each LAN interface, a connected LAN interface may be carried out, for example, through the use of the Address Resolution Protocol ('ARP'), Neighbor Discovery Protocol ('NDP'), or other mechanism for identifying link layer addresses for adjacent computing devices.

In the example of FIG. 4, identifying (302) physical topology data for each server (110, 112, 114, 116) in the computing system (100) also includes determining (408), for each connected LAN interface, whether the connected LAN interface belongs to a switch. Determining (408), for each connected LAN interface, whether the connected LAN interface belongs to a switch may be carried out by polling the device that includes the connected LAN interface for device information, for example, using a discovery protocol such as the Link Layer Discovery Protocol ('LLDP').

In the example of FIG. 4, identifying (302) physical topology data for each server (110, 112, 114, 116) in the computing system (100) also includes identifying (410) a virtual LAN interface that is associated with the connected LAN interface for each connected LAN interface that belongs to a switch. In the example of FIG. 4, a virtual LAN interface is a data structure that includes information describing an interface between a server and a VLAN. In the example of FIG. 4, the virtual LAN interface resides with the switch, or a port thereon, such that identifying (410) a virtual LAN interface that is associated with the connected LAN interface is carried out by polling the switch. A virtual LAN interface can include information such as an identifier for the VLAN and an identifier of a particular port on the switch that connects the server to the VLAN. Identifying (410) a virtual LAN interface that is associated with the connected LAN interface may be carried out, for example, by polling the switch that includes the connected LAN interface for VLAN information using a discovery protocol such as LLDP.

In the example of FIG. 4, identifying (302) physical topology data for each server (110, 112, 114, 116) in the computing system (100) also includes creating (412), for each virtual LAN interface, a shadow virtual LAN interface for the server (110, 112, 114, 116). In the example of FIG. 4, a shadow virtual LAN interface is a data structure that includes information describing an interface between a server and a VLAN. The shadow virtual LAN interface resides with the server and mirrors a virtual LAN interface that resides with a switch. The shadow virtual LAN interface may therefore be used to consolidate information, such an virtual LAN interface, IP interface, and LAN interface, on a single device such as the server (110, 112, 114, 116) rather than having this information distributed across multiple devices such as the switch and the servers (110, 112, 114, 116). In the example of FIG. 4, creating (412), for each virtual LAN interface, a shadow virtual LAN interface for the server (110, 112, 114, 116) may be carried out, for example, by gathering information regarding each virtual LAN interface on each switch and storing such information with each server that a virtual LAN interface is associated with.

In the example of FIG. 4, identifying (302) physical topology data for each server (110, 112, 114, 116) in the computing system (100) also includes associating (414), for each shadow virtual LAN interface, the shadow virtual LAN interface with the LAN interface and the IP interface. In the example of FIG. 4, associating (414), for each shadow virtual LAN interface, the shadow virtual LAN interface with the LAN interface and the IP interface may be carried out, for example, by through the use of a table or other data structure in which a single record includes fields for specifying an identifier for a shadow virtual LAN interface, an identifier for a LAN interface, and an identifier for a IP interface such that each of the interfaces are associated with each other based on their inclusion in a single record.

Figure 5:
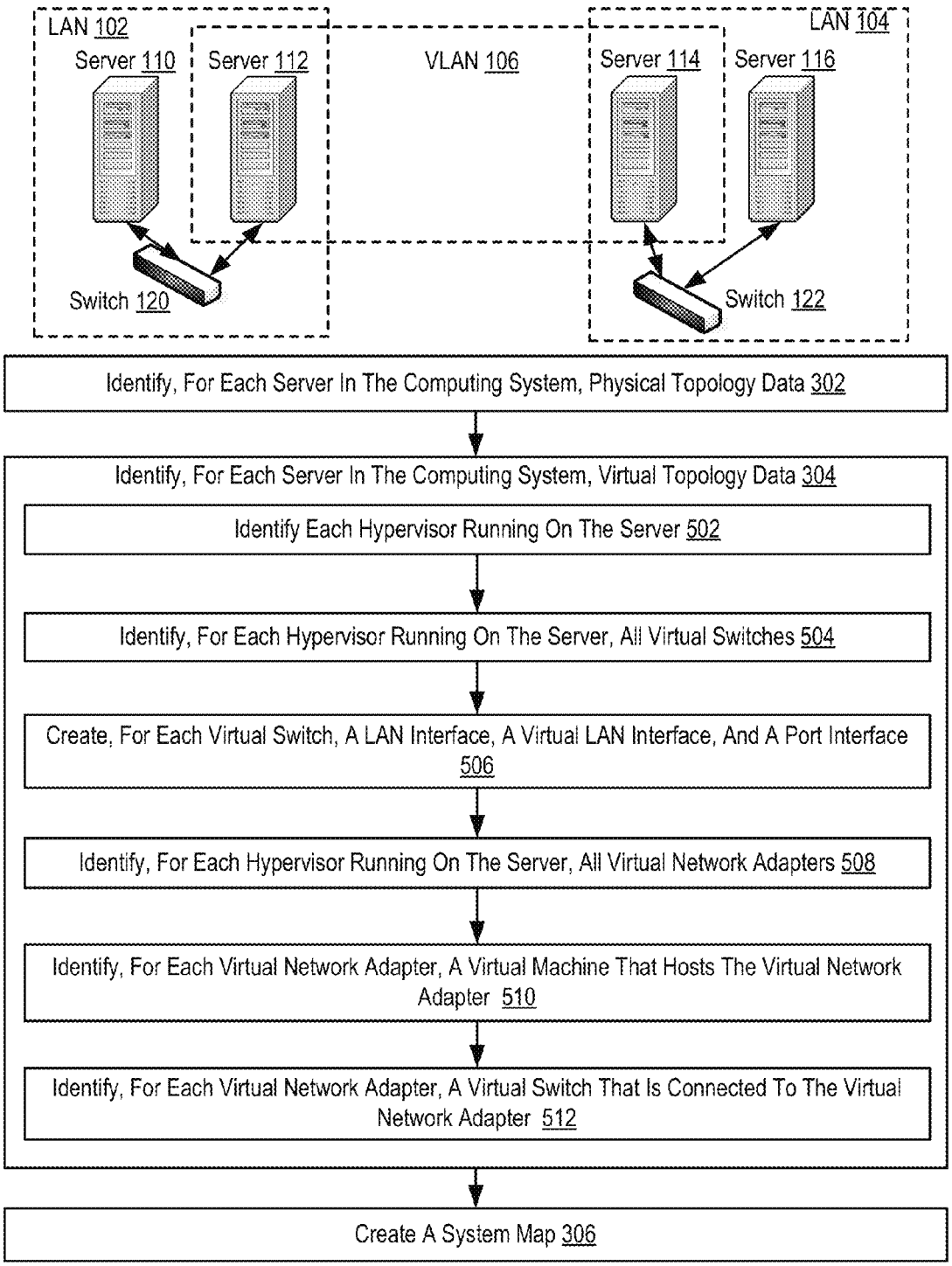
FIG. 5 sets forth a flow chart illustrating an example method for establishing relationships among elements in a computing system according to embodiments of the present invention.

For further explanation, FIG. 5 sets forth a flow chart illustrating an example method for establishing relationships among elements in a computing system (100) according to embodiments of the present invention. The example of FIG. 5 is similar to the examples of FIG. 3 and FIG. 4 as it also includes identifying (302), for each server (110, 112, 114, 116) in the computing system (100), physical topology data; identifying (304), for each server (110, 112, 114, 116) in the computing system (100), virtual topology data; and creating (306), in dependence upon the physical topology data and the virtual topology data, a system map.

In the example of FIG. 5, identifying (304), for each server (110, 112, 114, 116) in the computing system (100), virtual topology data includes identifying (502) each hypervisor running on the server (110, 112, 114, 116). In the example of FIG. 5, a hypervisor is a module of automated computing machinery for managing virtual machines that are executing on a particular physical device. The hypervisor is a mechanism of platform-virtualization, a module of automated computing machinery that allows multiple operating systems to run concurrently in separate virtual machines on a same host computer. Hypervisors may be embodied as native, bare metal hypervisors that run directly on a host's hardware or alternatively embodied as hosted hypervisors that run within an operating system environment. Examples of hypervisors useful or that can be improved for use in administration of virtual machine affinity in a data center according to embodiments of the present invention include IBM's zNM™, VMware's vCenter™, INTEGRITY™ from Green Hills Software, LynxSecure™ from LynxWorks, IBM's POWER Hypervisor (PowerVM)™, Oracle's VM Server™, and Sun's Logical Domains Hypervisor™.

In the example of FIG. 5, identifying (502) each hypervisor running on the server may be carried out, for example, by polling the server to identify hypervisors running on the server (110, 112, 114, 116). In some embodiments, each hypervisor must register with an operating system such that polling the server to identify hypervisors running on the server (110, 112, 114, 116) can include requesting from the operating system a list of processes running on the operating system and identifying those processes that correspond to a hypervisor. Alternatively, the hypervisor itself may expose an application programming interface ('API') that enables calls to be made directly to the hypervisor itself so that discovery calls can be made to the hypervisor which will reveal itself in turn.

In the example of FIG. 5, identifying (304), for each server (110, 112, 114, 116) in the computing system (100), virtual topology data also includes identifying (504), for each hypervisor running on the server, all virtual switches. In the example of FIG. 5, a virtual switch is a software construct for routing data communications to a particular virtual machine that is supported by a particular hypervisor. Identifying (504), for each hypervisor running on the server, all virtual switches may be carried out, for example, by polling the hypervisor and requesting the identity of such virtual switches. Alternatively, if a hypervisor is managing the operations of multiple virtual machines, it can be assumed that a virtual switch, or functionality that is similar to the functionality of a virtual switch, is operational so that data communications can be routed to one of the many virtual machines that the hypervisor is managing.

In the example of FIG. 5, identifying (304), for each server (110, 112, 114, 116) in the computing system (100), virtual topology data also includes creating (506), for each virtual switch, a LAN interface, a virtual LAN interface, and a port interface. In the example of FIG. 5, creating (506), for each virtual switch, a LAN interface, a virtual LAN interface, and a port interface may be carried out, for example, by creating data structures for each interface. Each interface may include information such as an identifier of the virtual switch, an identifier of the LAN that the LAN interface can be used to connect to, and so on.

In the example of FIG. 5, identifying (304), for each server (110, 112, 114, 116) in the computing system (100), virtual topology data also includes identifying (508), for each hypervisor running on the server, all virtual network adapters. In the example of FIG. 5, a virtual network adapter is a software construct that represents a virtual machine's connection interface to a network. Identifying (508), for each hypervisor running on the server, all virtual network adapters may be carried out, for example, by identifying each virtual machine that a hypervisor supports and polling each virtual machine for information describing the virtual network adapter that serves as the virtual machine's interface to a network. Such information may be stored by the hypervisor such that the hypervisor itself has access to information describing the virtual network adapter that serves as the virtual machine's interface to a network.

In the example of FIG. 5, identifying (304), for each server (110, 112, 114, 116) in the computing system (100), virtual topology data also includes identifying (510), for each virtual network adapter, a virtual machine that hosts the virtual network adapter. In the example of FIG. 5, identifying (510), for each virtual network adapter, a virtual machine that hosts the virtual network adapter may be carried out by storing, in a table or other suitable data structure, information describing the virtual network adapter that serves as each virtual machine's interface to a network along with an identifier for each virtual machine.

In the example of FIG. 5, identifying (304), for each server (110, 112, 114, 116) in the computing system (100), virtual topology data also includes identifying (512), for each virtual network adapter, a virtual switch that is connected to the virtual network adapter. In the example of FIG. 5, identifying (512), for each virtual network adapter, a virtual switch that is connected to the virtual network adapter may be carried out, for example, by polling a hypervisor that manages the virtual machine that the virtual network adapter is associated with to determine which virtual switch the hypervisor is connected to. In such an example the virtual switch the hypervisor is connected to may be identified as the virtual switch that is connected to the virtual network adapter.

Figure 6:
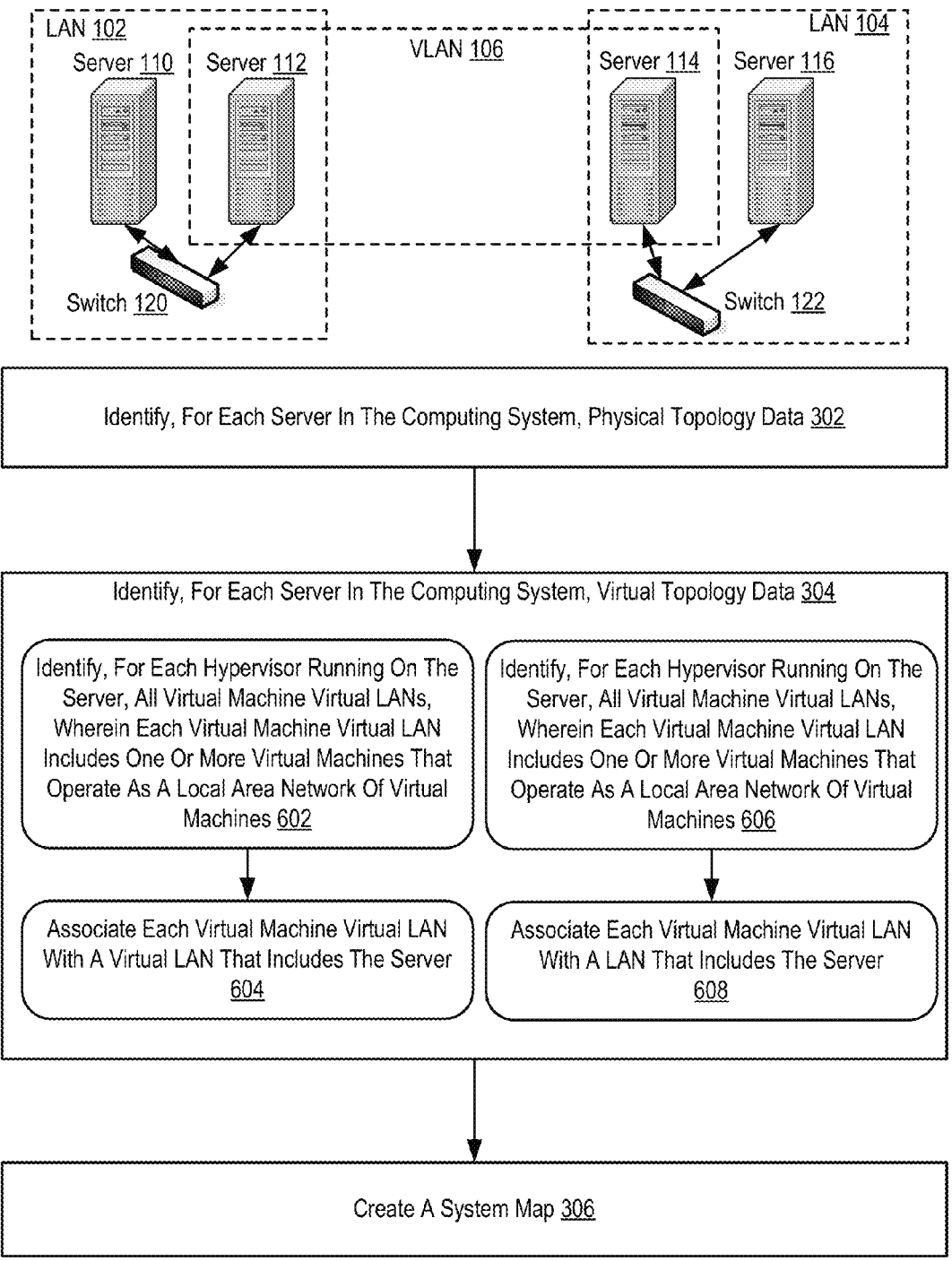
FIG. 6 sets forth a flow chart illustrating an example method for establishing relationships among elements in a computing system according to embodiments of the present invention.

For further explanation, FIG. 6 sets forth a flow chart illustrating an example method for establishing relationships among elements in a computing system (100) according to embodiments of the present invention. The example of FIG. 6 is similar to the examples of FIGS. 3-5 as it also includes identifying (302), for each server (110, 112, 114, 116) in the computing system (100), physical topology data; identifying (304), for each server (110, 112, 114, 116) in the computing system (100), virtual topology data; and creating (306), in dependence upon the physical topology data and the virtual topology data, a system map.

In the example of FIG. 6, identifying (304), for each server (110, 112, 114, 116) in the computing system (100), virtual topology data includes identifying (602), for each hypervisor running on the server, all virtual machine virtual LANs. In the example of FIG. 6, each virtual machine virtual LAN includes one or more virtual machines that operate as a local area network of virtual machines. In the example of FIG. 6, identifying (602), for each hypervisor running on the server, all virtual machine virtual LANs may be carried out, for example, by polling each hypervisor for information describing a particular virtual machine virtual LAN that each virtual machine that the hypervisor manages is part of, by polling each virtual machine itself to determine which virtual machine virtual LAN the virtual machine is connected to, or by polling a virtual switch for such information. After identifying each virtual machine virtual LAN, the virtual machine virtual LAN information from the virtual switch may be ported to the virtual machine in the form of shadow virtual machine virtual LAN interfaces. That is, an interface may be created on each virtual machine that mirrors the virtual machine virtual LAN interfaces contained in the virtual switch. The shadow virtual machine virtual LAN interfaces may also be included as members of the virtual machine virtual LAN.

In the example of FIG. 6, identifying (304), for each server (110, 112, 114, 116) in the computing system (100), virtual topology data also includes associating (604) each virtual machine virtual LAN with a virtual LAN that includes the server. In the example of FIG. 6, associating (604) each virtual machine virtual LAN with a virtual LAN that includes the server may be carried out, for example, by creating a table or other data structure whose records include a field for a virtual machine virtual LAN identifier with a virtual LAN identifier such that populating a record with an identifier for a virtual machine virtual LAN and also populating the same record with an identifier for the virtual LAN that includes the server associates the virtual machine virtual LAN with the virtual LAN that includes the server.

In the example of FIG. 6, identifying (304), for each server (110, 112, 114, 116) in the computing system (100), virtual topology data may alternatively include identifying (606), for each hypervisor running on the server, all virtual machine virtual LANs. In the example of FIG. 6, each virtual machine virtual LAN includes one or more virtual machines that operate as a local area network of virtual machines. Identifying (606), for each hypervisor running on the server, all virtual machine virtual LANs may be carried out, for example, by polling each hypervisor for information describing a particular virtual machine virtual LAN that each virtual machine that the hypervisor manages is part of, by polling each virtual machine itself to determine which virtual machine virtual LAN the virtual machine is connected to, or by polling a virtual switch for such information.

In the example of FIG. 6, identifying (304), for each server (110, 112, 114, 116) in the computing system (100), virtual topology data may also alternatively include associating (608) each virtual machine virtual LAN with a LAN that includes the server. In the example of FIG. 6, associating (608) each virtual machine virtual LAN with a LAN that includes the server may be carried out, for example, by creating a table or other data structure whose records include a field for a virtual machine virtual LAN identifier with a LAN identifier such that populating a record with an identifier for a virtual machine virtual LAN and also populating the same record with an identifier for the LAN that includes the server associates the virtual machine virtual LAN with the LAN that includes the server.

In the example of FIG. 6, creating a system map may be carried out by creating data structures to traverse relationships between subnet and VLANs for all the elements in the computing system. In such an example, data structures may be created such that a system, its VLAN interface, and its IP interface are connected to each other as a trio. This trio acts as a key to a subnets hashmap and a VLAN hashmap. Because the key connects these items of information, connections between a subnet and a VLAN may be established in order to identify which subnets are under a particular VLAN.

For further explanation, FIG. 7 sets forth an example GUI in which a system map is depicted as a table according to embodiments of the present invention. In the example of FIG. 7, each entry in the table is collapsible or expandable so as to depict relationships between the entries in table. In the example of FIG. 7, the GUI indicates that the depicted system map identifies a two virtual LANs: VLAN 106 and VLAN 108.

In the example of FIG. 7, VLAN 106 includes one subnet labeled as SUBN 102. The subnet includes two servers labeled as SRVR 110 and SRVR 112. The first server, labeled as SRVR 110, includes two virtual machines and an IP interface. The second server, labeled as SRVR 112, also includes two virtual machines and an IP interface. The VLAN 106 also includes one switch labeled as SWITCH 1.

In the example of FIG. 7, VLAN 108 includes one subnet labeled as SUBN 104. The subnet includes two servers labeled as SRVR 114 and SRVR 116. The first server, labeled as SRVR 114, includes two virtual machines and an IP interface. The second server, labeled as SRVR 116, also includes two virtual machines and an IP interface. The VLAN 108 also includes one switch labeled as SWITCH 2. Each entry in the table also includes an entry labeled as 'Access' that identifies whether the particular element is accessible by a system management application. Each entry in the table also includes an entry labeled as 'Problems' that identifies problems, error conditions, and the like that may exist at the particular element that is associated with a particular entry in the table. For example, the entry in the table for SRVR 112 indicates that the server is experiencing a low battery' condition, and the entry for SWITCH 2 indicates a software-out-of-date condition indicating that some software on the switch is in need of an update.

Figure 8:
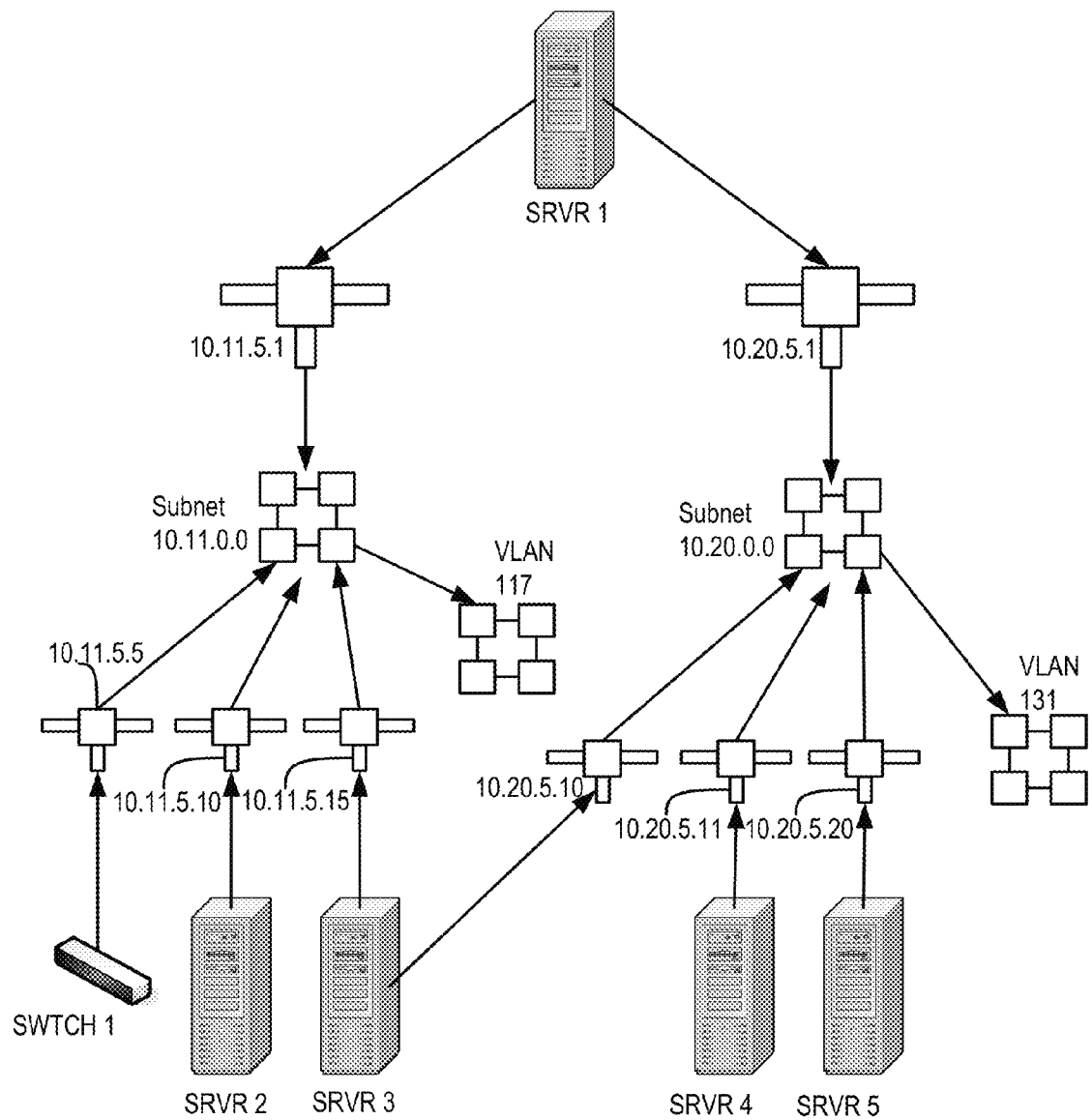
FIG. 8 sets forth an example GUI in which a system map is depicted as hierarchical structure according to embodiments of the present invention.

FIG. 8 sets forth an example GUI in which a system map is depicted as hierarchical structure according to embodiments of the present invention. In the example of FIG. 8, five servers are depicted and labeled as SRVR 1, SRVR 2, SRVR 3, SRVR 4, and SRVR 5. In the example of FIG. 8, SRVR 1 has a first IP interface labeled as 10.11.5.1. The IP interface labeled as 10.11.5.1 is part of a subnet labeled as 10.11.0.0. The subnet labeled as 10.11.0.0 also includes IP interfaces labeled as 10.11.5.5, 10.11.5.10, and 10.11.5.15, which belong to SWTCH 1, SRVR 2, and SRVR 3, respectively. As shown in FIG. 8, all members of subnet 10.11.0.0 are members of VLAN 117 as well.

In the example of FIG. 8, SRVR 1 also has a second IP interface labeled as 10.20.5.1. The IP interface labeled as 10.20.5.1 is part of a subnet labeled as 10.20.0.0. The subnet labeled as 10.20.0.0 also includes IP interfaces labeled as 10.20.5.10, 10.20.5.11, and 10.20.5.20, which belong to SRVR 3, SRVR 4, and SRVR 5, respectively. As shown in FIG. 8, all members of subnet 10.20.0.0 are members of VLAN 131 as well.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of establishing relationships among elements in a computing system, the computing system including one or more servers, one or more switches, the one or more servers and one or more switches forming one or more local area networks and also forming one or more virtual local area networks, the method comprising:
    identifying, for each server in the computing system, physical topology data;
    identifying, for each server in the computing system, virtual topology data, including:
        identifying each hypervisor running on the server;
        identifying, for each hypervisor running on the server, all virtual switches; and
        creating, for each virtual switch, a LAN interface, a virtual LAN interface, and a port interface; and
    creating, in dependence upon the physical topology data and the virtual topology data, a system map.

2. The method of claim 1 further comprising rendering the system map in a graphical user interface ('GUI').

3. The method of claim 1 wherein identifying, for each server in the computing system, physical topology data further comprises:
    identifying all internet protocol ('IP') interfaces;
    identifying, for each IP interface, a local area network ('LAN') interface associated with the IP interface;
    identifying, for each LAN interface, a connected LAN interface;
    determining, for each connected LAN interface, whether the connected LAN interface belongs to a switch;
    identifying, a virtual LAN interface that is associated with the connected LAN interface, for each connected LAN interface that belongs to a switch;
    creating, for each virtual LAN interface, a shadow virtual LAN interface for the server; and
    associating, for each shadow virtual LAN interface, the shadow virtual LAN interface with the LAN interface and the IP interface.

4. The method of claim 1 further comprising:
    identifying, for each hypervisor running on the server, all virtual network adapters;
    identifying, for each virtual network adapter, a virtual machine that hosts the virtual network adapter; and
    identifying, for each virtual network adapter, a virtual switch that is connected to the virtual network adapter.

5. The method of claim 4 further comprising:
    identifying, for each hypervisor running on the server, all virtual machine virtual LANs, wherein each virtual machine virtual LAN includes one or more virtual machines that operate as a local area network of virtual machines; and associating each virtual machine virtual LAN with a virtual LAN that includes the server.

6. The method of claim 4 further comprising:
identifying, for each hypervisor running on the server, all virtual machine virtual LANs, wherein each virtual machine virtual LAN includes one or more virtual machines that operate as a local area network of virtual machines; and associating each virtual machine virtual LAN with a LAN that includes the server.

7. The method claim 1 wherein creating, in dependence upon the physical topology data and the virtual topology data, a system map includes depicting all system elements in a table.

8. The method of claim 1 wherein creating, in dependence upon the physical topology data and the virtual topology data, a system map includes depicting all system elements in a hierarchical structure.

9. The method of claim 1 wherein creating, in dependence upon the physical topology data and the virtual topology data, a system map includes using a trio key that maps a system, its VLAN interface, and its IP interface together.

10. Apparatus for establishing relationships among elements in a computing system, the computing system including one or more servers, one or more switches, the one or more servers and one or more switches forming one or more local area networks and also forming one or more virtual local area networks, the apparatus comprising a computer processor, a computer memory operatively coupled to the computer processor, the computer memory having disposed within it computer program instructions that, when executed by the computer processor, carry out the steps of:
identifying, for each server in the computing system, physical topology data;
identifying, for each server in the computing system, virtual topology data, including:
identifying each hypervisor running on the server;
identifying, for each hypervisor running on the server, all virtual switches; and
creating, for each virtual switch, a LAN interface, a virtual LAN interface, and a port interface; and
creating, in dependence upon the physical topology data and the virtual topology data, a system map.

11. The apparatus of claim 10 further comprising computer program instructions that, when executed by the computer processor, carry out the step of rendering the system map in a graphical user interface ('GUI').

12. The apparatus of claim 10 wherein identifying, for each server in the computing system, physical topology data further comprises:
identifying all internet protocol ('IP') interfaces;
identifying, for each IP interface, a local area network ('LAN') interface associated with the IP interface;
identifying, for each LAN interface, a connected LAN interface;
determining, for each connected LAN interface, whether the connected LAN interface belongs to a switch;
identifying, a virtual LAN interface that is associated with the connected LAN interface, for each connected LAN interface that belongs to a switch;
creating, for each virtual LAN interface, a shadow virtual LAN interface for the server; and associating, for each shadow virtual LAN interface, the shadow virtual LAN interface with the LAN interface and the IP interface.

13. The apparatus of claim 10 further comprising computer program instructions that, when executed by the computer processor, carry out the steps of:
identifying, for each hypervisor running on the server, all virtual network adapters;
identifying, for each virtual network adapter, a virtual machine that hosts the virtual network adapter; and
identifying, for each virtual network adapter, a virtual switch that is connected to the virtual network adapter.

14. The apparatus of claim 13 computer program instructions that, when executed by the computer processor, carry out the steps of:
identifying, for each hypervisor running on the server, all virtual machine virtual LANs, wherein each virtual machine virtual LAN includes one or more virtual machines that operate as a local area network of virtual machines; and
associating each virtual machine virtual LAN with a virtual LAN that includes the server.

15. The apparatus of claim 13 computer program instructions that, when executed by the computer processor, carry out the steps of:
identifying, for each hypervisor running on the server, all virtual machine virtual LANs, wherein each virtual machine virtual LAN includes one or more virtual machines that operate as a local area network of virtual machines; and
associating each virtual machine virtual LAN with a LAN that includes the server.

16. A computer program product for establishing relationships among elements in a computing system, the computing system including one or more servers, one or more switches, the one or more servers and one or more switches forming one or more local area networks and also forming one or more virtual local area networks, the computer program product disposed upon a non-transitory computer readable storage medium, the computer program product comprising computer program instructions that, when executed, cause a computer to carry out the steps of:
identifying, for each server in the computing system, physical topology data;
identifying, for each server in the computing system, virtual topology data, including:
identifying each hypervisor running on the server;
identifying, for each hypervisor running on the server, all virtual switches; and
creating, for each virtual switch, a LAN interface, a virtual LAN interface, and a port interface; and
creating, in dependence upon the physical topology data and the virtual topology data, a system map.

17. The computer program product of claim 16 further comprising computer program instructions that, when executed, cause the computer to carry out the step of rendering the system map in a graphical user interface ('GUI').

18. The computer program product of claim 16 wherein identifying, for each server in the computing system, physical topology data further comprises:
identifying all internet protocol ('IP') interfaces;
identifying, for each IP interface, a local area network ('LAN') interface associated with the IP interface;
identifying, for each LAN interface, a connected LAN interface;
determining, for each connected LAN interface, whether the connected LAN interface belongs to a switch;

identifying, a virtual LAN interface that is associated with the connected LAN interface, for each connected LAN interface that belongs to a switch;

creating, for each virtual LAN interface, a shadow virtual LAN interface for the server; and associating, for each shadow virtual LAN interface, the shadow virtual LAN interface with the LAN interface and the IP interface.

19. The computer program product of claim 16 further comprising computer program instructions that, when executed, cause the computer to carry out the steps of:

identifying, for each hypervisor running on the server, all virtual network adapters;

identifying, for each virtual network adapter, a virtual machine that hosts the virtual network adapter; and identifying, for each virtual network adapter, a virtual switch that is connected to the virtual network adapter.

20. The computer program product of claim 16 further comprising computer program instructions that, when executed, cause the computer to carry out the steps of:

identifying, for each hypervisor running on the server, all virtual machine virtual LANs, wherein each virtual machine virtual LAN includes one or more virtual machines that operate as a local area network of virtual machines; and associating each virtual machine virtual LAN with a virtual LAN that includes the server.

21. The computer program product of claim 16 further comprising computer program instructions that, when executed, cause the computer to carry out the steps of:

identifying, for each hypervisor running on the server, all virtual machine virtual LANs, wherein each virtual machine virtual LAN includes one or more virtual machines that operate as a local area network of virtual machines; and associating each virtual machine virtual LAN with a LAN that includes the server.

* * * * *